3,770,858
METHOD FOR RETREADING TIRES
Newell J. Ireland, Akron, and Gary R. Getz, Norton, Ohio, assignors to McNeil Corporation, Akron, Ohio
Filed Sept. 10, 1971, Ser. No. 179,308
Int. Cl. B29n 5/04
U.S. Cl. 264—36                 5 Claims

ABSTRACT OF THE DISCLOSURE

A method for manipulating and curing a tire having at least the tread renewed including inserting the tire in mold sections having an internal diameter in the tread area substantially the same as the external diameter of the tread portion of the tire by engaging the beads of the tire with bead ring portions of the extended bladder assemblies to center the tire between the mold sections, inflating the tire to partially retract the bead rings thereby displacing the beads of the tire outwardly to reduce the external diameter of the tread portion of the tire, encapsulating the tire within the mold by extending the mold sections to the closed position while maintaining the beads of the tire displaced outwardly, and bringing the bolsters into contact with the mold sections to return the beads of the tire to their original position before curing.

BACKGROUND OF THE INVENTION

The present invention relates generally to a method for retreading tires. More particularly, the invention relates to curing press apparatus constructed to carry out a method for retreading tires.

The process of renewing the tread portion of a pneumatic tire is commonly termed recapping or retreading. This process contemplates buffing off the remainder of the worn tread to substantially the outer wall of the tire casing. The buffed casing is then externally circumscribed with a buildup of new impressionable tread rubber. This tread rubber is bonded to the tire casing and a tread profile is formed on the exterior surface thereof by positioning the tire in contact with molds in the presence of suitable heat and pressure. The present invention is directed to a method and apparatus for accomplishing this latter step.

In general, two rather diverse approaches have been taken as to the method and apparatus to be employed to effect mating of the tire and mold for vulcanization. By their nature, each of these methods and the apparatus employed have certain advantages and disadvantages, although both have enjoyed extensive use. Basically, the two methods differ in the extent or type of mold apparatus which is employed.

One method contemplates the use of a partial mold or matrix which engages the tread and shoulder portion of a tire during retreading but not the sidewall or bead areas. The tire is brought into contact with the matrix by means of a rigid annular curing rim which is positioned in the tire casing and an inflatable toroidal curing bag which is interposed between the curing rim and the interior surface of the casing or innerliner of the tire casing. The entire assembly is then positioned on a heating device. An advantage of this method is that simple, inexpensive two piece molds can be used, and the partial encasement of the tire permits wide flexibility in the number of different tire sizes and configurations which can be processed in a single mold despite substantial variations in the external bead to bead measurements of tire casings. A significant disadvantage of this method is brought about by the fact that extensive hand manipulation is necessary to position the curing rim and bag since no commercially feasible automated rimming and bagging apparatus has been developed.

The other primary method more nearly parallels the method and apparatus employed in the vulcanization of new tires. In this instance, full or complete molds are employed which engage substantially the entire exterior surface of a tire from bead to bead. However, only relatively minor deviations in bead to bead measurements between tire casings can be tolerated, therefore many more molds are required to handle a range of tire casing sizes. These complete molds are normally built into a press which has automatic apparatus for manipulating the mold sections and for controlling the flow of heating and pressurizing fluids. These very evident advantages of employing a press are offset primarily by the relatively high initial cost.

Recent developments in the use of either of the above methods have been directed to a large extent to the problem of introducing a tire casing with the new tread rubber affixed into an optimum size mold without disturbing or otherwise damaging the tread rubber. In the case where a press is employed, there is normally provision for the retention and actuation of segmented molds wherein the tread portions of the mold can be separately moved; however, molds of this type tend to be prohibitively expensive, particularly when it is taken into account that more different sizes are required in the use of full or complete molds.

Therefore, in the practice of both of the above described methods, extensive efforts have been undertaken to provide means and methods for temporarily reducing the diameter of the tread portion of a tire while it is positioned in a two part mold. In the use of partial molds or matrices the beads may be displaced inwardly or outwardly to effect a reduction in tread diameter. Either approach tends to produce additional problems, many of which can be solved only by additional hand labor, in that bead engaging devices are normally employed over which the tire must be button-holed for outward displacement, or at least a top bead assembly must be positioned after placement of the tire relative to a lower bead engaging device in the case of inward displacement of the beads.

In addition, in the practice of both methods and particularly with respect to the use of full molds, numerous efforts have been made to make portions of the molds engaging the beads or sidewalls or both resiliently or otherwise movable to accommodate greater variations in tire sizes in terms of bead to bead measurements. However, the increased cost of such elaborate mold construction tends to negate the operational flexibility which is achieved.

Thus, efforts to solve the individual problems of the prior art methods and apparatus or to combine advantageous features of each have generally been only partially effective and have tended to produce additional problems with corresponding cost increases attendant their solution.

SUMMARY OF THE INVENTION

Therefore, an object of the present invention is to provide a tire retreading method utilizing a press employing only partial two part molds or matrices without the necessity for rimming and bagging the tire. Another object of the invention is to provide such a method utilizing a press having a bead engaging ring associated with each of the two matrices which is adjustable to permit processing of a variety of tire sizes in terms of bead to bead measurements in the same matrix. A further object of the invention is to provide such a method utilizing a press wherein the bead engaging rings are independently movable relative to the matrices so that the beads may be maintained in a spread position reducing the tire diameter while the two parts of a matrix are positioned relative to the tire, thereby precluding possible damage to the tread portion of the tire by interference with the matrix. Another object is to provide a method utilizing a press which maintains the tire tread centered with respect to the beads during the entire operations of positioning the tire in the matrix and curing.

Still another object of the invention is to provide a method utilizing controlled flexible support associated with the press engaging the external portion of the tire sidewall at differing positions to further enhance the flexibility of the press in handling tires of differing bead to bead measurements. A still further object is to provide a method utilizing a press which can position and form a tire to be retreaded in a matrix without the necessity for an internal bladder or diaphragm. Yet another object of the invention is to reduce the cure time by providing radiation heating internally of the tire from a source located radially inwardly of the tire and in unobstructed relation to the inside of the tire casing, thereby increasing the production capacity of the press.

Yet a further object of the invention is to provide a method utilizing a retread press which achieves relatively rapid curing times without the necessity for water or steam fittings and the attendant expenses. A still further object is to provide a method utilizing a press which is sufficiently uncomplex, automated, and inexpensive that the original expense is readily recoverable in terms of reduced mold costs and labor savings.

In general, the method according to the invention for manipulating and curing a tire having at least the tread renewed utilizing apparatus including relatively movable bolsters mounting mold sections for engaging the tire tread, a bladder assembly attached to each bolster for engaging the exterior portion of the tire not engaged by the mold sections, and a fluid inlet interiorly of the tire to force the tire into contact with the mold sections. The above apparatus provides for carrying out a method of inserting the tire in mold sections having an internal diameter in the tread area substantially the same as the external diameter of the tread portion of the tire by engaging the beads of the tire with bead ring portions of the extended bladder assemblies to center the tire between the mold sections, inflating the tire to partially retract the bead rings thereby displacing the beads of the tire outwardly to reduce the external diameter of the tread portion of the tire, encapsulating the tire within the mold by extending the mold sections to the closed position while maintaining the beads of the tire displaced outwardly, and bringing the bolsters into contact with the mold sections to return the beads of the tire to their original position before curing.

DESCRIPTION OF THE DRAWINGS

FIG. 4 showing the lower backup bladder assembly extended with a tire to be cured positioned thereon and the upper backup bladder assembly extended, the press head moving toward the tire by virtue of press closing operation, FIG. 5 showing the upper backup bladder assembly having moved into contact with the upper bead of the tire such that the upper and lower tire beads are seated against the upper and lower backup bladder assemblies, respectively, the closing of the press having stopped, FIG. 6 showing the tire inflated to overcome the pressure in the cylinders extending the backup bladder assemblies, whereby the backup bladder assemblies are retracted to spread the tire beads and thereby reduce the diameter of the tire, FIG. 7 showing the upper and lower mold sections extended to the closed position to encapsulate the tread and shoulder portion of the tire while it is maintained at a reduced diameter, all prior to the final press closing to the position of FIG. 1 for completing the curing cycle.

DESCRIPTION OF PREFERRED EMBODIMENT

Figure 1:
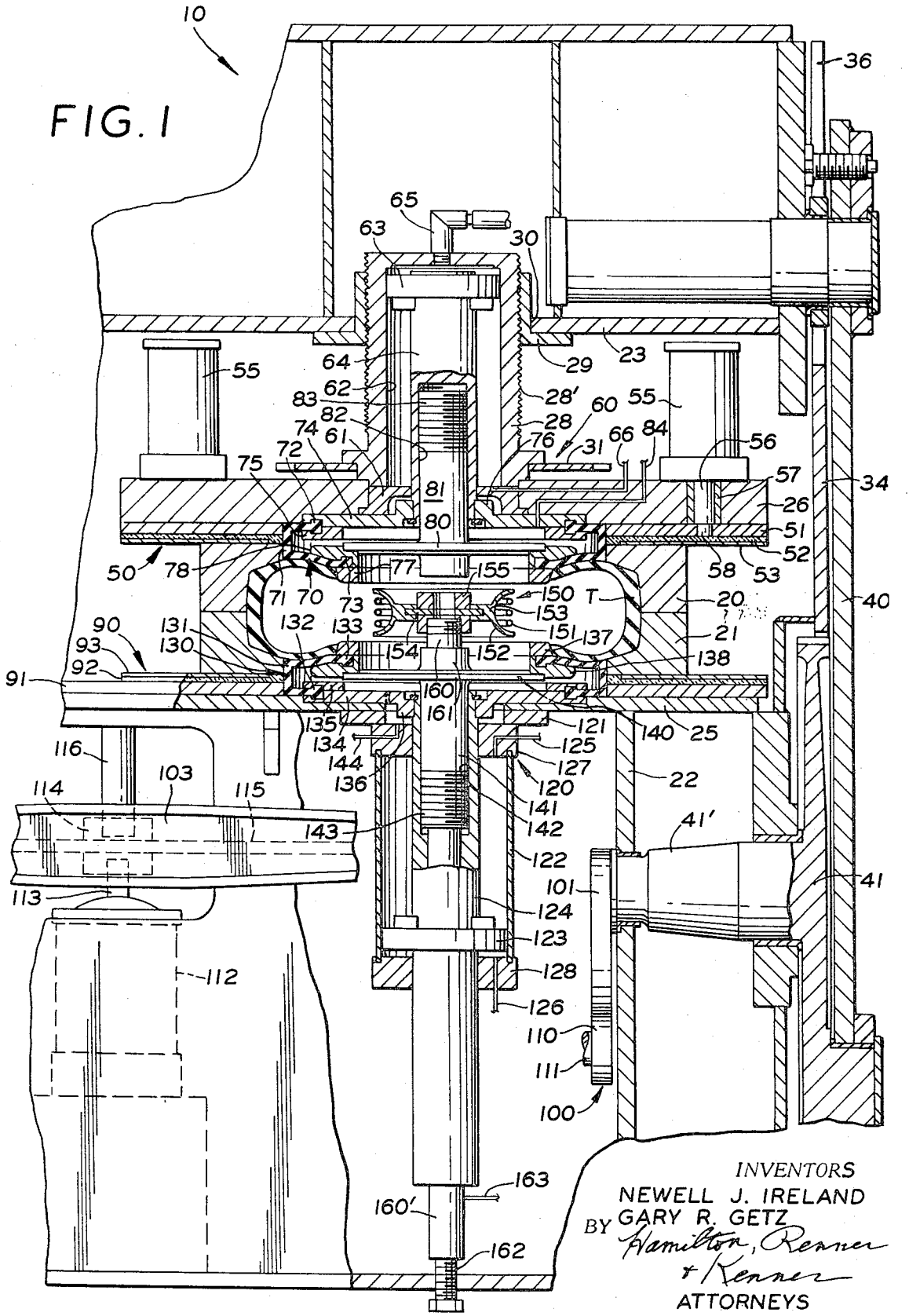
FIG. 1 is a fragmentary elevation view, with portions shown in section, depicting a retread press in the closed position and particularly the portions depicting apparatus according to the concepts of the present invention and capable of carrying out the method herein disclosed and described.

Although various types and designs of presses may be employed to carry the components for manipulating a tire as described herein, a press of the general type disclosed in prior U.S. Pat. No. 3,336,635 and the references therein constitutes one example of suitable press structure. Referring to FIG. 1, a suitable press, generally indicated by the numeral 10, is adapted to mount separable upper and lower mating mold sections 20 and 21, respectively, which may according to the concepts of the present invention be partial molds or matrices which are adapted to engage only the tread and shoulder portions of a tire T to be retreaded.

The lower mold section 21 is supported on a press base member 22 including a lower bolster 25 in a manner hereinafter described. The upper mold section 20 is carried by a cross beam 23 and an upper bolster 26 in a manner hereinafter described. The cross beam 23 is connected to upper bolster 26 by an adjusting sleeve 28 which has upper bolster 26 attached at its lower extremity and which is externally threaded at 28' to engage an internally threaded ring 29 nonrotatably attached as at 30 to a bore in cross beam 23. Suitable adjusting means such as a ring gear 31 attached to adjusting sleeve 28 may be provided to move the upper bolster 26 relative to cross beam 23 to accommodate mold sections of different thicknesses.

The cross beam 23 carrying the upper bolster 26 is movable relative to lower bolster 25 and associated components by appropriate press drive components. In general, the cross beam 23 is pivotally attached to the upper end of operating links 40 on opposite sides of the press. The links 40 are pivotally attached to and actuated by motor driven bull gears 41 to move in a controlled path in guideways 36 in the guide plates 34. The structural details of such press drive components and the operation thereof are shown in detail in the above-mentioned U.S. Pat. No. 3,336,635, and particularly the discussion of element 20–42 therein, to which reference is made for such additional detail as might be required. It should also be appreciated that the description herein is directed to one side of a dual press as the preferred embodiment, although the principles would be equally applicable to a single mold cavity press.

The upper mold section 20 is spaced from and positioned relative to the upper bolster 26 by an upper mold mounting assembly, generally indicated by the numeral 50. The upper mold mounting assembly 50 includes a mold mounting plate 51 adjacent the upper bolster 26, a matrix insulation sheet 52, and an insulation cover plate 53, all of which are joined and to which the upper mold section 20 is attached. The upper mold mounting assembly 50 has one or more cylinders 55 which may be positioned on the upper bolster 16 so that the piston rods 56 extend through a sleeve 57 in bolster 26 and are attached to the mold mounting plate 51 as by the threads 58. Thus actuation of the cylinders 55 moves the upper mold section 20 from the position of FIG. 1 to the position of FIG. 7.

Located centrally of the upper bolster is an upper center mechanism, generally indicated by the numeral 60. The upper center mechanism 60 has an attachment ring 61 which couples the upper bolster 26 and the adjusting sleeve 28 which in addition to serving the above described function of accommodating different mold sizes also serves as a cylinder casing by virtue of an axial bore 62. Movably mounted within the bore 62 of sleeve 28 is a piston assembly 63 having an extending piston rod 64. The travel of piston assembly 63 in the bore 62 is controlled by the ingress and egress of fluid, preferably air, through ducts 65 and 66 schematically shown at the extremities of the sleeve 28 in the end wall of sleeve 28 and the attachment ring 61, respectively.

The upper center mechanism 60 is part of and actuates an upper backup bladder assembly, generally indicated by the numeral 70. The upper backup bladder assembly 70 includes an elastomeric upper backup bladder 71 which is of appropriate configuration to engage the outer bead and sidewall portion of a tire T and provide a degree of resilient support for the sidewall portion when positioned as depicted in FIG. 1. The upper backup bladder 71 has an upper bead 72 and a lower bead 73 which are selectively spaced to accommodate different bladder sizes dependent upon the size of tire T being retreaded and to accommodate tires of different bead set or spacing and external bead to bead dimension, although minor variations are compensated for by the resiliency of the bladder in the tire sidewall area.

The upper bead 72 of upper backup bladder 71 is retained between a ring plate 74 and a clamp ring 75 which is removably attachable thereto for bladder replacement. The ring plate 74 has a hub 76 which is freely rotatably mounted but axially fixed on the piston rod 64. The lower bead 73 of upper backup bladder 71 is retained between a bead ring 77 and a clamp ring 78 both of which are removably attachable to a positioning plate 80, again for bladder replacement. The positioning plate 80 has a projecting shank 81 which is received in a bore 82 in piston rod 64 and is selectively axially positioned therein as by a threaded portion 83. Thus, although the beads 72, 73 of upper backup bladder retain the same spacing during actuation of the piston rod 64, the spacing axially of piston rod 74 may be varied by rotating the positioning plate 80. The backup bladder 71 is selectively supplied, as hereinafter described, with fluid through a duct 84.

The lower mold section 21 is spaced from and positioned relative to the lower bolster 25 by a lower mold mounting assembly, generally indicated by the numeral 90. The lower mold mounting assembly 90 includes a mold mounting plate 91 adjacent the lower bolster 25, a matrix insulation sheet 92, and an insulation cover plate 93, all of which are joined and to which the lower mold section 21 is attached. The lower mold section 21 could be actuated by a series of cylinders comparable to the upper mold actuation cylinders 55, together with suitable controls; however, according to the preferred embodiment of the invention, the lower mold actuation assembly, generally indicated by the numeral 100, takes advantage of the proximity of major press drive components.

Figure 2:
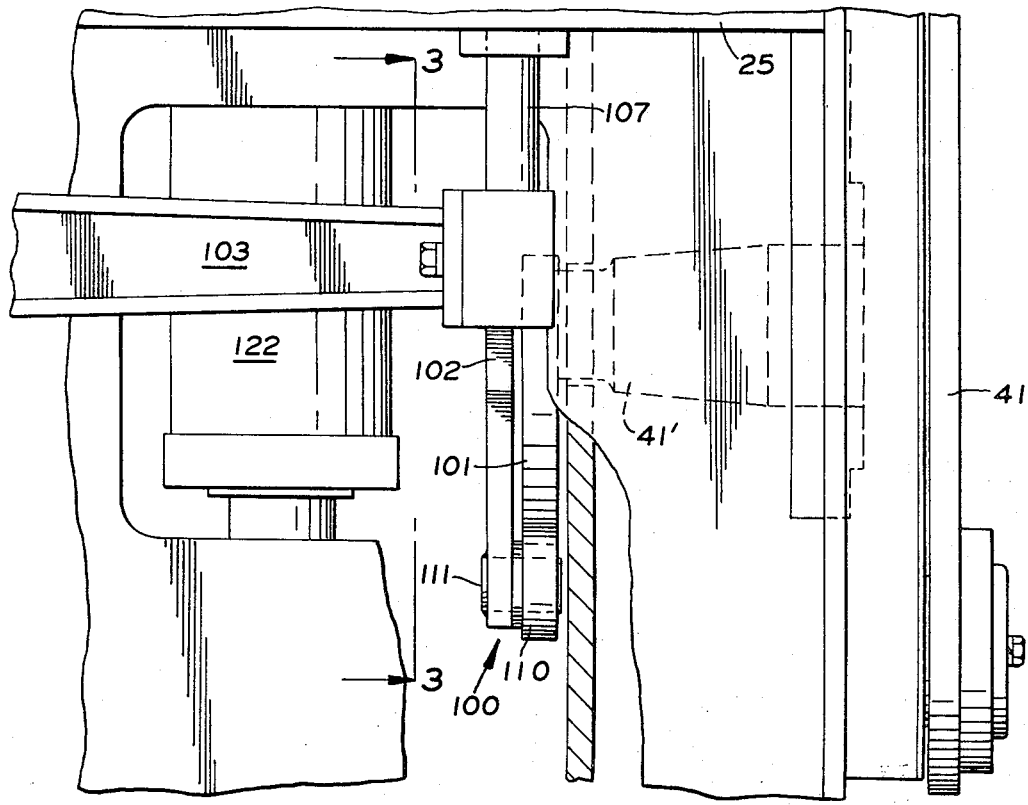
FIG. 2 is an enlarged fragmentary elevation view of the portion of the retread press of FIG. 1 which actuates a lower matrix section mounted in the press.
Figure 3:
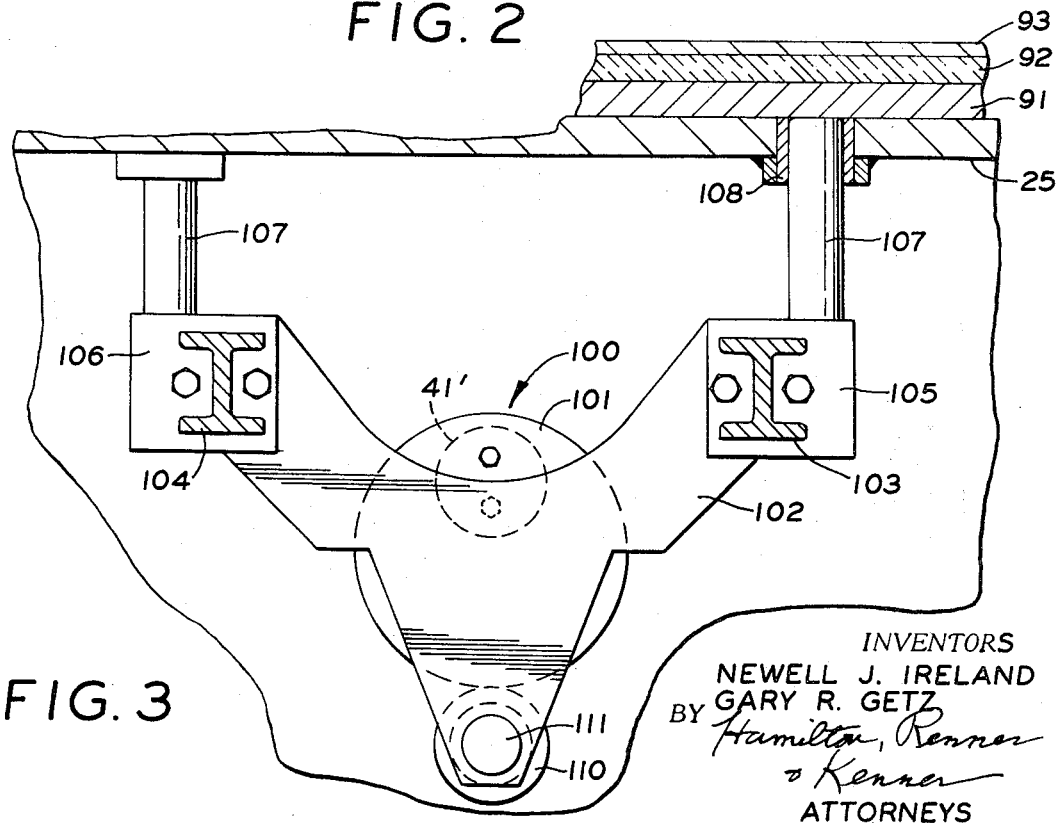
FIG. 3 is a fragmentary elevation, partially in cross section, taken substantially along the line 3—3 of FIG. 2.

As shown in FIGS. 1–3, the lower mold actuation assembly 100 has cams 101 which are attached to and rotate with the crank gear shafts 41' of crank gears 41 at each end of the press. Yokes 102 located at each end of the press are joined to front and rear support beams 103 and 104 by clamps 105 and 106, respectively. The clamps 105, 106 also carry support rods 107 which extend through a sleeve 108 in lower bolster 25 and engage the lower surface of mold mounting plate 91, as seen at the right hand side of FIG. 3. The yokes 102 also carry cam followers 110 mounted on shafts 111 for engagement with the cams 101. The yokes 102 and associated cam followers 110 are selectively biased into engagement with cams 101 by means of a cylinder 112 (FIG. 1) which may be located substantially medially of the press 10. The cylinder rod 113 engages a coupler 114 which is connected to webs 115 extending inwardly from support beams 103, 104. The coupler 114 may also carry a guide rod 116 extending into lower bolster 25 to assure alignment of the support rods 107 in the sleeves 108.

Figure 6:
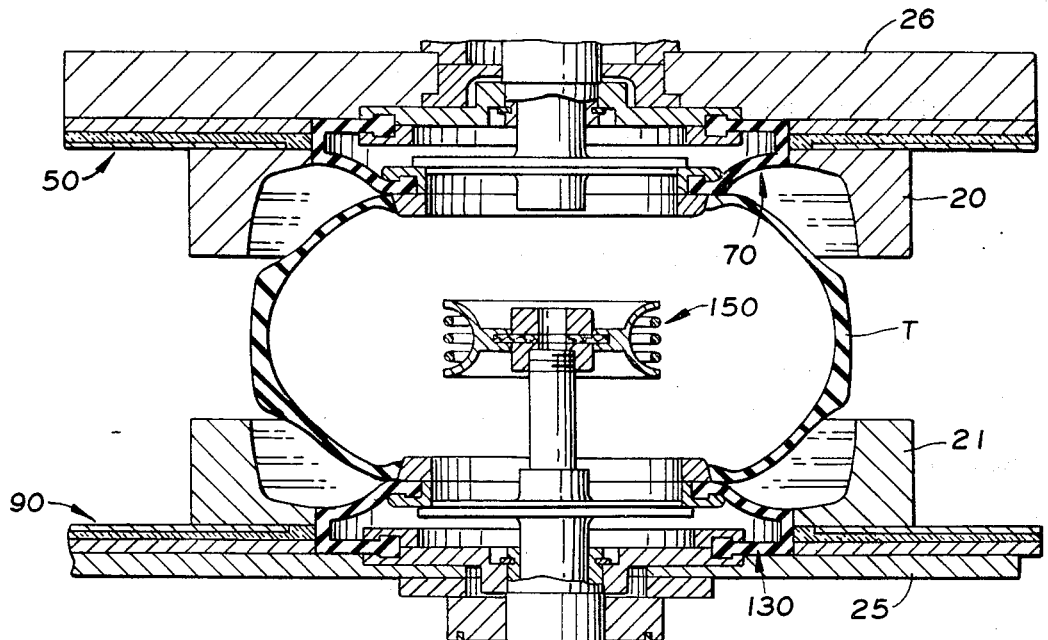
Figure 7:
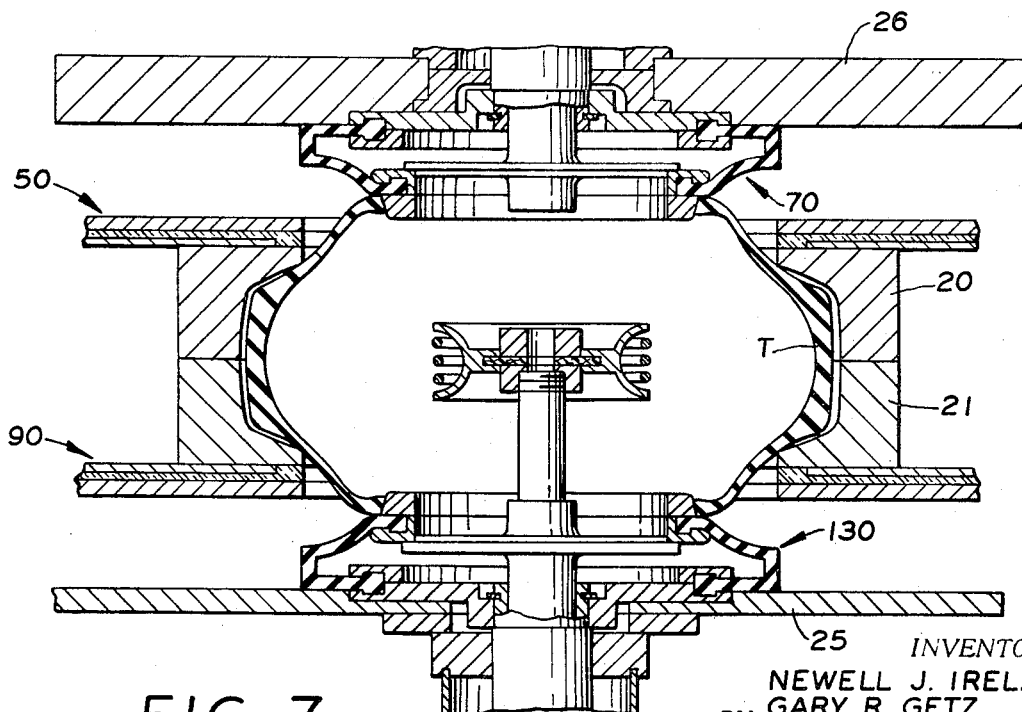

The cylinder 112 is not actuated until after the operations depicted in FIG. 6, at which time actuation moves the lower mold section 21 to the position of FIG. 7. The cams 101 are oriented so that cam followers 110 are in engagement at that time. The subsequent rotation of cams 101 with press closure actuated by crank gears 41 moves the lower mold section 21 at one half the rate of the upper bolster 26 due to the configuration of cams 101, with the cams 101 assuming the position of FIG. 3 when the press 10 is fully closed as seen in FIG. 1. This results in the mold sections 20, 21 remaining equidistant between the bolsters 25, 26 during closure of the press from the position of FIG. 7 to FIG. 1, whereby the tread section of tire T is maintained centered with respect to the beads thereof.

Located centrally of the lower bolster 25 is a lower center mechanism, generally indicated by the numeral 120. The lower center mechanism 120 has an attachment flange 121 which couples the lower bolster 25 and a cylinder casing 122 having a piston assembly 123 with a piston rod 124 movably mounted therein. The travel of piston assembly 123 in cylinder casing 122 is controlled by the ingress and egress of fluid through ducts 125 and 126 in upper and lower end walls 127 and 128, respectively, sealing cylinder casing 122.

The lower center mechanism 120 is part of and actuates a lower backup bladder assembly, generally indicated by the numeral 130. The lower backup bladder assembly 130 includes an elastomeric lower backup bladder 131 structurally similar to the upper backup bladder 71 and functioning similarly. The lower backup bladder 131 has a lower bead 132 and an upper bead 133 which are selectively spaced as the beads 72, 73 for the same reason of accommodating varying bladder sizes dependent upon mold and tire sizes.

The lower bead 132 of lower backup bladder 131 is retained between a ring plate 134 and a clamp ring 135 which is removably attached thereto for bladder replacement. The ring plate 134 has a hub 136 which is freely rotatably mounted but axially fixed on the piston rod 124. The upper bead 133 of lower backup bladder 131 is retained between a bead ring 137 and a clamp ring 138 both of which are removably attachable to a positioning plate 140, again for bladder replacement. The positioning plate 140 has a projecting shank 141 which is received in a bore 142 in piston rod 124 and is selectively axially positioned therein as by a threaded portion 143. Thus, although beads 132, 133 of the lower backup bladder retain the same spacing during actuation of the piston rod 124, the relative axial spacing may be varied by rotating positioning plate 140 to accommodate different bladder sizes. The backup bladder 131 is selectively supplied, as hereinafter described, with fluid through a duct 144.

Interposed between positioning plates 80 and 140 is a radiation heating ring, generally indicated by the numeral 150. As shown the heating ring 150 is of generally cylindrical configuration and may have a plurality of electrically energized elements 151 positioned proximate a somewhat annular shield 152 having a bifurcated inner annular flange 153 which fits on a disk shaped insulator 154. The insulator 154 may be attached to a cap 155 positioned atop a pipe 160 extending out of a hub 161 on the positioning plate 140.

Inflation fluid, preferably air, may be provided internally of the tire T by extending the pipe 160 through bores in the hub 161, positioning plate 140, shank 141, and piston rod 124 to emerge where designated 160'. Medial positioning of heating ring 150 between plates 80, 140 may be achieved for differing mold and backup bladder sizes by an adjustable stop 162 which engages the lower extremity of pipe 160. Inflation fluid may be provided as required through a duct 163.

PRESS OPERATION

The operating sequence of the press 10 equipped as detailed above is now described in conjunction with the schematic sequential depictions of FIGS. 4-7.

Figure 4:
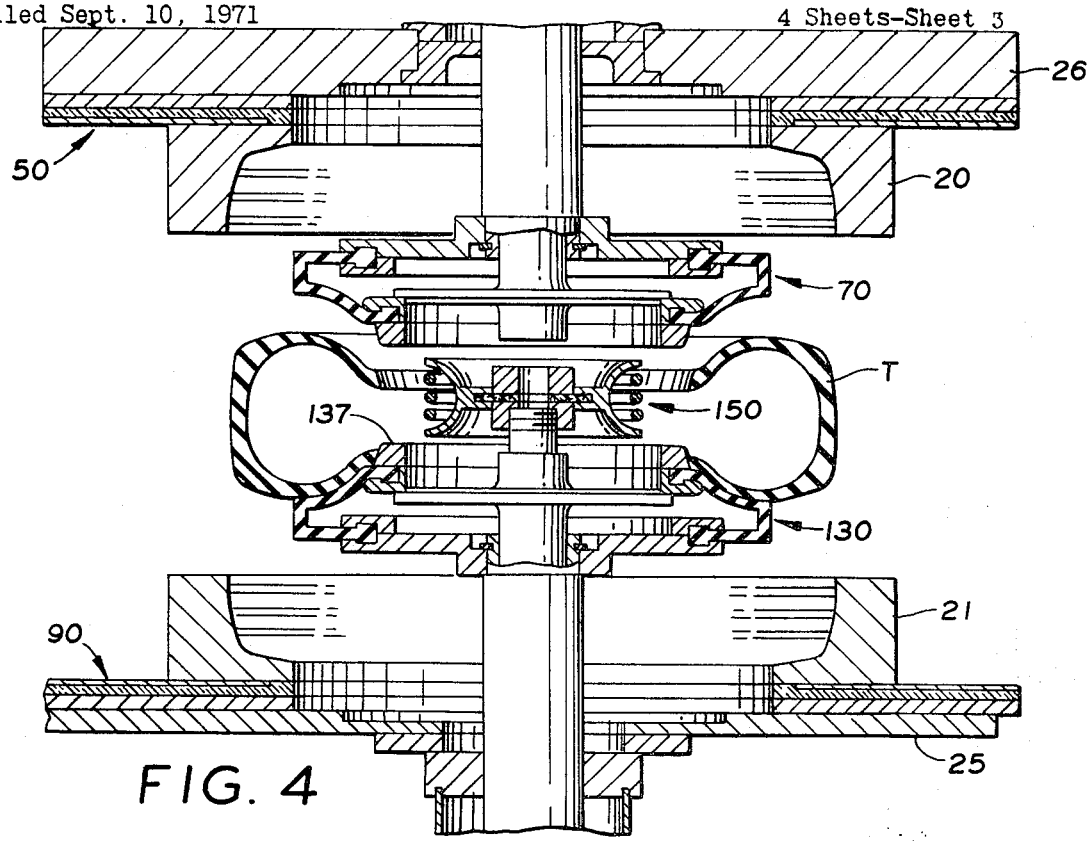
FIGS. 4–7, inclusive, are somewhat schematic sequential views, similar to but presenting only a fragmentary portion of the apparatus of FIG. 1, depicting certain operating positions of the major operative components of the retread press of the present invention.

In FIG. 4 the upper and lower backup bladder assemblies 70, 130 are extended away from the respective bolsters 26 and 25, and a tire T to be cured is positioned on the bead ring 137 of lower backup bladder assembly 130. The press is shown in the process of closing. The upper and lower mold mounting assemblies 50, 90, carrying mold sections 20 and 21, respectively, are retracted against the bolsters 26, 25. The heating ring 150 may be energized at the beginning of press closing or any time thereafter to allow the heating element to reach operating temperature thus tending to minimize cure time.

Figure 5:
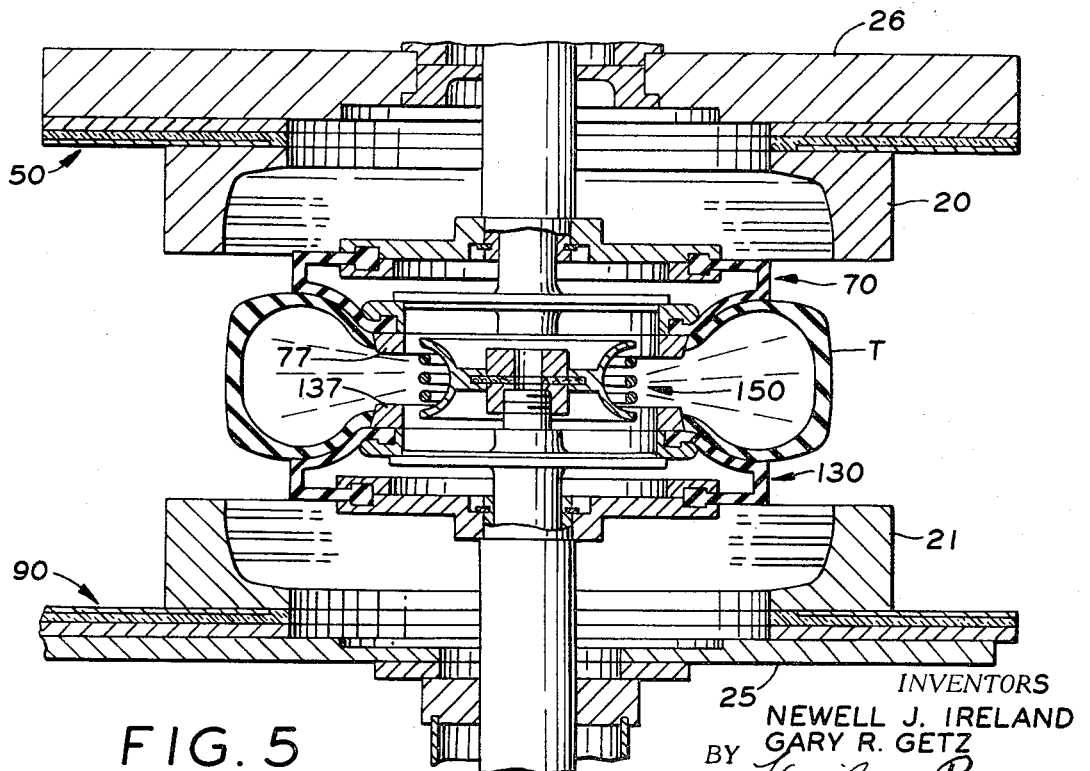

As seen in FIG. 5, the press 10 stops short of the full closed position of FIG. 1 at a predetermined position with the bead ring 77 of upper backup bladder assembly 70 engaging the upper bead of the tire T while the bead ring 137 of lower backup bladder assembly 130 remains in engagement with the lower bead of the tire T. The mold mounting assemblies 50, 90 remain retracted against the bolsters 26, 25.

The progression from FIG. 5 to FIG. 6 is achieved by internally inflating the tire T by by the ingress of fluid through pipe 160 of sufficient pressure to overcome the cylinder pressures extending backup bladder assemblies 70, 130, thereby causing said assemblies to retract as seen in FIG. 6. The outward displacement of the beads of tire T produces a reduction in the diameter of the tread portion. The heating ring 150 remains energized.

While the beads of the tire T are maintained outwardly displaced as seen in FIG. 6, the upper and lower mold mounting assemblies 50, 90 are actuated so that the mold sections 20, 21 are extended outwardly of the bolsters 26, 25 to encapsulate the tread and shoulder portions of the tire T.

The press 10 then continues to close to the full closure position depicted in FIG. 1. The cylinders controlling backup bladder assemblies 70, 130 are then exhausted. The backup bladders 71 and 131 are then inflated to the inflation pressure inside the tire T. The pressure inside the tire T and in backup bladders 71, 131 is then simultaneously increased to cure pressure. The partial mold sections or matrices 20, 21, which are then in contact with the tire T and which may have steam chambers or electric elements according to standard practice in the art, combine with the heating ring 150 to provide the requisite curing temperature in the tire T.

After completion of the curing cycle, the tire T may be stripped from the mold sections 20, 21 by commencing press opening with the mold mounting assemblies 50, 90 retracted and maintained against the bolsters 26, 25. As the press begins to open, the upper backup bladder assembly 70 is actuated to extend away from bolster 26 to strip the tire T from the upper mold section 20. Subsequently, the lower backup bladder assembly 130 is actuated to extend away from bolster 26 to strip the tire T from lower mold section 21. The cured tire then reposes as seen in FIG. 4, except that the upper bolster 26, mold mounting assembly 50 and backup bladder assembly 70 are displaced a greater distance from the tire T due to press opening, for convenient removal of the tire T from the press 10. It will also be apparent to persons skilled in the art that press operation and arrangement of components is such that a variety of types of automatic loading and unloading apparatus could be used in conjunction with the press to further automate handling of the tire T, if desired.

What is claimed is:

1. A method of inserting a tire having a renewed tread portion to be cured in a press having mold sections movably mounted on separable bolsters wherein the internal diameter in the tread area of the mold sections is substantially the same as the external diameter of the tread portion of the tire comprising the steps of, engaging the beads of the tire with the bead rings extended from a position proximate the mold sections and bolsters thereby centering the tire between the mold sections which are spaced and retracted against the bolsters, inflating the tire to at least partially retract the bead rings, thereby displacing the beads of the tire outwardly to reduce the external diameter of the tread portion of the tire, encapsulating the tire within the mold by extending the mold sections to the closed position, all the while maintaining the beads of the tire displaced outwardly, and subsequently returning the beads of the tire to their original position preparatory to curing by moving the bolsters carrying the retracted bead rings into contact with the mold sections.

2. A method according to claim 1 including the step of heating the tire from a heat source located within the tire.

3. A method according to claim 2 including the step of maintaining the mold sections substantially equally spaced between the bolsters while bringing the bolsters into contact with the mold sections.

4. A method according to claim 1 including the step of resiliently supporting the sidewall portion of the tire during curing.

5. A method according to claim 4, including equalizing the pressure internally of the tire and wtihin a resilient support engaging the sidewall portion of the tire during curing.

References Cited

UNITED STATES PATENTS

| | | | |
|---|---|---|---|
| 3,184,794 | 5/1965 | Sherkin | 425—19 |
| 3,646,191 | 2/1972 | Zangl | 264—315 |

ROBERT F. WHITE, Primary Examiner

J. H. SILBAUGH, Assistant Examiner

U.S. Cl. X.R.

264—94, 326; 425—19, 21, 22, 24